Figure 1:
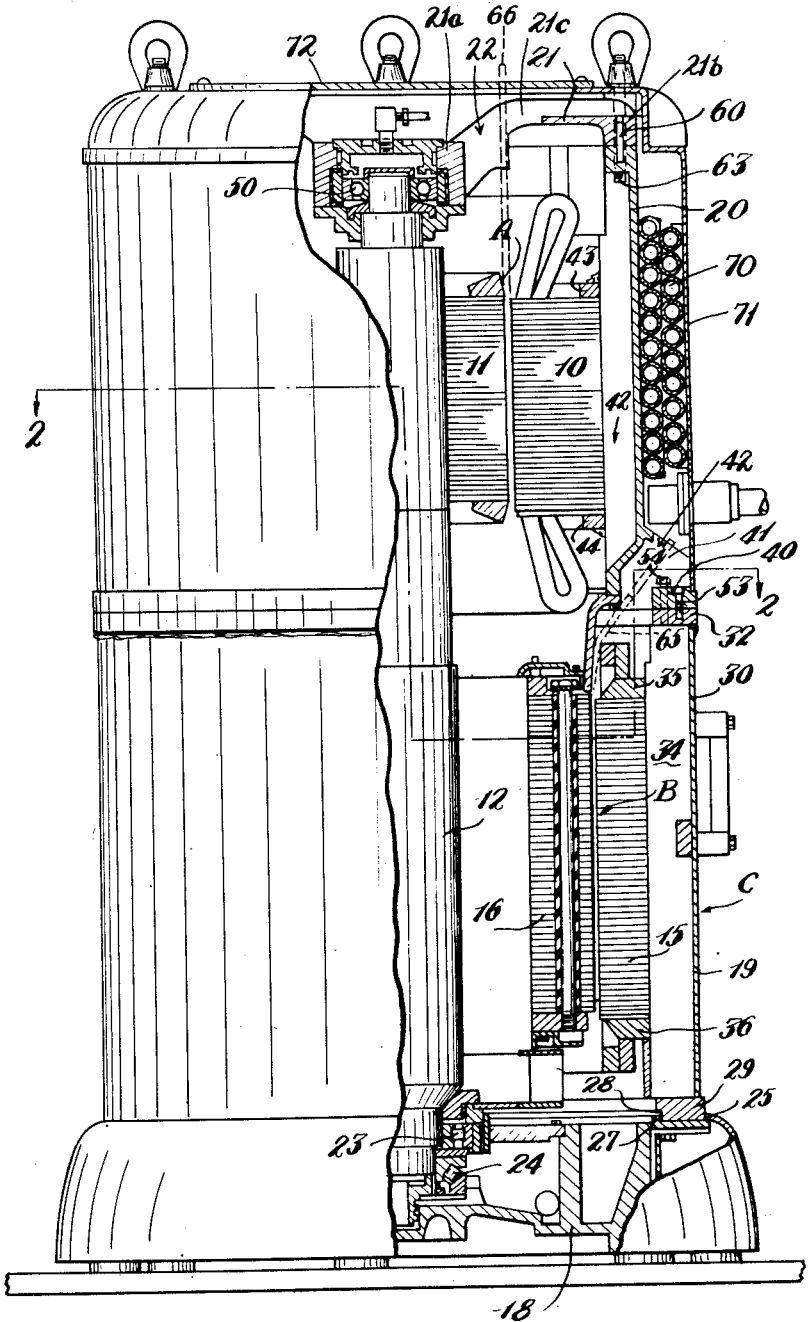

INVENTOR.
EDWARD J. KACZOR
BY
ATTORNEY

April 9, 1957  E. J. KACZOR  2,787,824
METHOD OF ASSEMBLING TWO-BEARING
MOTOR-GENERATOR UNITS
Filed Aug. 1, 1951  2 Sheets-Sheet 2

INVENTOR.
EDWARD J. KACZOR
BY
ATTORNEY

United States Patent Office 2,787,824
Patented Apr. 9, 1957

2,787,824

METHOD OF ASSEMBLING TWO-BEARING MOTOR-GENERATOR UNITS

Edward J. Kaczor, Cleveland, Ohio, assignor to The Ohio Crankshaft Company, Cleveland, Ohio, a corporation of Ohio Application August 1, 1951, Serial No. 239,696

2 Claims. (Cl. 29—155.5)

This invention pertains to the art of motor generators and, more particularly, to a method of assembly of motor-generator units of the two-bearing type to insure accurate alignment of the parts thereof.

The invention is particularly adapted to high-frequency motor-generator units of the inductor-alternator type having a vertical axis of rotation and will be described with particular reference thereto, although it will be appreciated that the invention has broader applications.

Such high-frequency motor-generator equipment generally includes an inductor alternator and a motor all contained within the same housing, the shaft supporting the rotor being supported at the upper and lower ends only. The clearances between the moving parts of equipment of this type are generally very small and very critical, particularly when compared to the over-all dimensions of the equipment or when compared to other types of rotating electrical equipment. The physical size of such equipment and the expense of large machinery precludes assembling the motor and generator and then machining the bearing and rotor-facing surfaces to the required clearances and alignments. Accordingly, the various parts of the equipment must be machined at different times and on different machines. Holding diameters to accurate dimensions is not unduly difficult but it has been found extremely difficult and expensive to machine the diameters sufficiently concentric with the desired axis of rotation of the equipment such that, when the equipment is finally assembled, the required clearances between the moving parts will be accurately established.

The present invention contemplates a construction and method of assembly of such equipment which permits of a maximum economy of manufacture, does not require high-concentricity tolerances of the component parts of the final machine and, yet, permits of accurate control of clearances in the assembled machine.

In accordance with the invention, a motor-generator assembly is provided including unitary rotors and shaft, a base having bearing supports for the vertical shaft, a unitary generator stator and housing mounted on the base, a unitary motor stator and housing mounted on the generator housing, and an end bell having bearing supports for the opposite end of the shaft mounted on the rotor housing. The two housings are so made as to be radially movable relative to each other and the end bell is likewise made to be radially movable with the motor stator and housing. The generator housing and base each have cylindrical surfaces concentric with the axis of rotation so that, when assembled, the inner surface of the stator is exactly coaxial with the desired axis of rotation. The rotor shaft is then assembled so that it is rotatably supported on the base. Feeler gages, all of equal thickness, are then inserted in circumferentially spaced relationship between the generator rotor and the generator stator. The motor housing is then positioned on the generator housing and feeler gages are inserted between the opposed surfaces of the motor rotor and the motor stator, these feeler gages also being of equal thickness and circumferentially spaced around the rotor. With these feeler gages in position, the engaging portions of the motor housing and generator housing are drilled through and doweled together and then bolted together. In a like manner, the end bell is assembled on the upper end of the shaft and on top of the motor housing. The engaging portions are drilled and doweled and then bolted. Subsequently, the feeler or spacer gages are then removed through suitable openings.

With such an arrangement, the base and generator housing form a reference point for locating the shaft. The remaining parts are all located relative to the shaft and the entire assembly rigidly bolted together to hold the clearances established by the feeler gages.

The principal object of the invention is the provision of a new and improved method of assembling a multipiece motor-generator unit which provides for the maximum ease of manufacture, the elimination of high-tolerance machining of the various component parts and which is dependable and provides a maximum accurate alignment of the moving parts relative to the stator.

Figure 2:
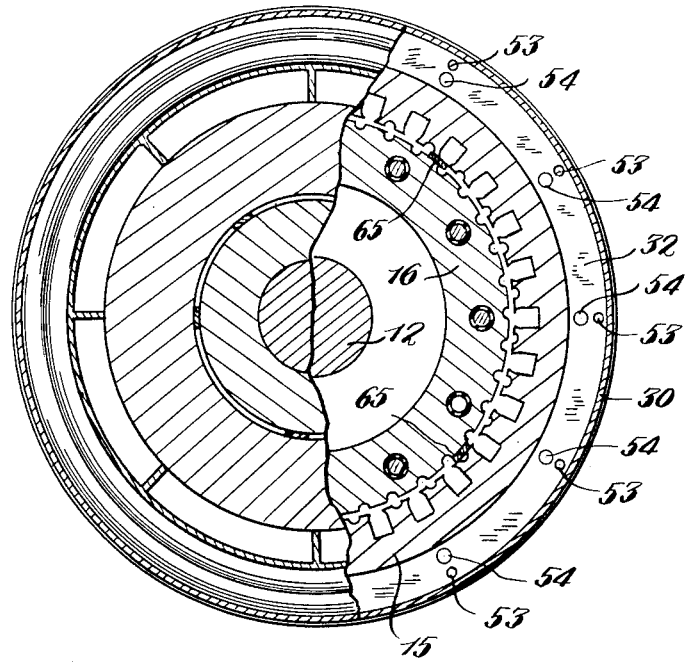

The invention will be specifically set forth and defined in the claims appended to the end hereof. The invention may take physical form in a number of different-appearing but equivalent arrangements and combinations of parts. A preferred embodiment of one of such arrangements will be described in detail in this specification and illustrated in the accompanying drawing which is a part hereof, and wherein:

Figure 1 is a side sectional view of a high-frequency motor-generator unit of the inductor-alternator type having a vertical axis of rotation; and Figure 2 is a top cross-sectional view of Figure 1 taken approximately on the line 2—2.

Referring now to the drawings, the figures show a motor A, a high-frequency generator B of the inductor-alternator type, all enclosed in a multipiece housing C. The motor A is relatively conventional and includes the stator 10 and a rotor 11 mounted on a vertical shaft 12 which is continuous from the top to the bottom of the enclosure C. The generator is also relatively conventional and includes a stator 15 and a rotor 16 also mounted on the shaft 12. The enclosure C includes a base 18, a generator-stator housing 19, a motor-stator housing 20 and an end bell 21.

The base 18 is generally a casting and has, centrally formed or machined therein, bearing supports for a pair of roller bearings 23, 24 which support the lower end of the shaft 12 for rotation about a vertical axis. The upper side of the base 18 also has an upwardly-facing horizontal circular surface 25 and a cylindrical outwardly-facing vertical surface 27 which meets with a corresponding surface 28 formed on a ring 29 which forms the lower end of the generator housing 19. The vertical surface 27 is machined to be exactly concentric with the bearing-supporting surfaces and, thus, the axis of rotation of the shaft 12. As each of these surfaces may be machined on the same machine tool in sequential operations, obtaining this concentricity is not difficult.

In a like manner, the surface 28 is machined to be exactly concentric with the inner surface of the generator stator 15 so that, when the generator stator and housing are positioned on the base 18, the inner surface of the generator stator will be exactly concentric with the axis of rotation of the shaft 12.

The generator housing 19 is comprised generally of a cylindrical cover member 30 having, welded to the lower end, the ring 29; and, to the upper end, a ring 32, the upper surface of which is preferably machined to be exactly perpendicular to the axis of the rotor-facing surfaces of the stator 15. The housing also includes a plurality of circumferentially spaced, axially-extending metallic members 34 which are welded to the inside of the cover 30. The generator laminations which form the generator stator 15 are supported between these members 34 and are held in assembled relationship therewith by upper and lower rings 35, 36 which are welded to the inner surfaces of the members 34.

The motor housing 20 may take any desired construction but, in the embodiment shown, comprises a generally cylindrical casting having, at the lower outer end thereof, an integral ring 40 interconnected with the remainder of the housing by a plurality of circumferentially-spaced, radially-extending web members 41. Air spaces 42 exist between the webs 41, reference to which will be made hereinafter. As shown, the motor stator 10 is mounted on the inner surface of the motor housing 20 and is held in position by upper and lower rings 43, 44 which are welded to the inner surface of the motor housing 20.

To all intents and purposes, the motor stator 10 and the motor housing 20 may be considered as a unitary member, the parts of which are all fixed relative to each other. In the same manner, the generator stator 15 and the generator housing 19 may be considered as a unitary member with the relative parts thereof all fixed relative to each other.

The lower surface of the ring 40 is machined to be exactly perpendicular to the axis of the inwardly-facing surface of the motor stator 10. In a like manner, the upper surface of the ring 32 of the generator housing also has a surface machined to be exactly perpendicular to the axis of rotation of the shaft 12.

The upper surface of the motor housing 20 is machined to have a surface exactly perpendicular to the axis of the opening of the motor stator 10.

The end bell 21 is comprised of an inner member 21a having a central opening into which the end of the shaft projects and is rotatably supported therein by a roller bearing 50. As shown, the end bell 21 also includes an outer ring 21b which rests on the upper end of the motor housing 20 and the lower side of the ring 21b is machined to have a surface exactly perpendicular to the axis of the opening in the end bell. The member 21a and ring 21b are integrally joined by radial webs 21c having spaces or openings 22 therebetween, the purpose of which openings will appear hereinafter.

With the construction shown and described, it will be appreciated that the motor housing is radially movable relative to the stator housing. In a like manner, the end bell is radially moving relative to the motor housing. On the other hand, the axes of the openings in the motor stator 10 and the end bell 21, while of necessity being exactly parallel, will not necessarily have to be aligned until the final assembly operation is completed.

In the embodiment shown, the ring 40 of the motor housing is fixedly positioned relative to the ring 32 by means of a plurality of circumferentially spaced dowels 53 which are forced into vertical openings drilled through the rings 40 and 32 when they are in assembled relationship. These dowels prevent radial or circumferential movement of the two ring members. In addition, bolts 54 or other fastening means pass through other vertical openings in the two rings and prevent relative axial movement of the two members. These bolts may pass through openings in the ring member 40 which have a diameter considerably greater than the diameter of the bolt itself.

In a like manner, the end bell 21 is held against radial movement relative to the motor housing 20 by means of a plurality of circumferentially-spaced dowels 60 which have a tight interference fit with vertical holes drilled through the end bell into the upper end of the motor housing 20. Threaded bolts 63 also extend through the end bell into the motor housing to prevent axial movement or removal of the end bell relative to the motor housing. The holes through which these bolts 63 pass in the end bell may, in a like manner to the openings in the ring member 40, be slightly larger in diameter than the diameter of the bolts 63.

This larger diameter of the openings through which the bolts pass permits of a slight freedom of movement between the various members before final assembly as will subsequently appear.

In the manufacture of a motor-generator unit, the bearing supports in the base 18 are first machined and ground to accurately-controlled dimensions. The support surface 25 is then machined to be square with the axis of rotation and the shoulder 27 is machined to be exactly concentric with the axis of rotation. This may all be done in a single machine tool and the concentricity is easily maintained.

The generator stator and housing are next assembled as a unitary rigid unit. The inner surface of the stator is then ground to as perfect a cylindrical form as possible. Subsequently, the lower surface of the ring 29 and the upper surface of the ring 32 are ground to be absolutely square with the axis of the cylinder and the surface 28 is ground to be exactly concentric with this axis. This is all done in a single machine and the concentricity is readily held. The assembled generator stator and housing is then assembled on the base, the concentric surfaces 27 and 28 mating to exactly align the axis of the cylinder with the desired axis of rotation of the shaft. As will appear, the surfaces 27 and 28 are the only ones on which the concentricity must be exactly held.

The motor stator and housing are then assembled as a rigid unitary unit. The inner surface of the motor stator is then ground to a perfect cylinder. Subsequently, the lower surfaces on the ring 40 and the upper surfaces on the motor housing are ground so as to be perfectly square with the axis of the cylinder. This is done in a single machine and the perpendicular relationship of the surfaces and the axis is readily held.

In a like manner, the end bell is formed to provide the central opening for receiving the upper end of the shaft and the lower surfaces on the end bell are ground so as to be perfectly square with the axis of the opening in the end bell.

Following the assembly of the generator stator and housing on the base, the rotor, which has also been ground so as to have a surface concentric with the desired axis of rotation, is assembled with its lower bearings and then lowered through the generator stator into assembled position. Shims 65 are then positioned between the generator-rotor surface and the generator-stator surface. A plurality of these shims are employed at points spaced circumferentially around the generator. The exact thickness of these shims is unimportant so long as they fill the clearance between the rotor and the stator. The important thing is that they all be of exactly the same thickness so that the generator rotor is accurately aligned with and accurately spaced from all surfaces of the generator stator. These shims may be made of flexible steel strip, so that the surfaces thereof can conform to the curved surfaces of the rotor and the stator or the shims may be ground to conform to this curvature. These shims preferably extend generally the entire length of the generator rotor and stator and have a length such that they project upwardly above the generator and through the spaces 42 between the webs 41 so that they may be removed at a later time in the assembly operation.

The motor stator and housing assembly is then placed into position about the motor rotor with the lower surfaces of the ring 40 resting on the upper surfaces of the ring 42. Shims 66 are then positioned between the motor rotor and the motor stator in a manner similar to that employed with the generator. These shims extend beyond the end of the motor so that they may be easily removed later. After these shims are in position, the motor stator will be exactly aligned with the motor rotor. Holes are then drilled through the ring 40 into the ring 42. These holes are reamed to a desired size and the dowel pins 53 are inserted. These dowel pins exactly hold the adjusted position of the motor stator relative to the generator stator and, thus, to the motor rotor. The threaded bolts 54 extending through the rings 40 and 32 are then positioned and tightened up.

After assembly of the motor housing and generator housing, the end bell is placed into position. The radial position of this end bell is accurately determined by the surfaces on the shaft and the bearings on the upper end of the shaft. Holes are then drilled through the end bell into the upper end of the motor housing, reamed and dowel members 60 inserted therein. Thus, the end bell is accurately aligned with the remainder of the units and this end bell tends to hold the rotor member and shaft in exact aligned relationship with the motor stator. Subsequently, the bolts 63 are added to hold the end bell in assembled relationship with the motor housing. The shims 65 and 66 employed to align the generator rotor and stator and the motor rotor and stator respectively are then removed by pulling them axially out of the generator and motor air gaps through the spaces 42 and 22 respectively.

After this assembly operation is completed, then the heat exchanger 70, the cover 71 therefor and an upper cover 72 may be placed in position and suitably secured therein. The positioning of the heat exchanger and covers forms no part of the present invention and has been shown simply to show a completed motor-generator unit.

With the method of machining the surfaces and the method of assembly just described, it will be appreciated that a minimum number of surfaces require high-concentricity machining, particularly as to concentricity with the axis of rotation of the rotors and, yet, when the unit is finally and fully assembled, complete and full accuracy of alignment of all the members is absolutely assured.

In the embodiment of the invention described, it will be appreciated that there are two surfaces; namely, surfaces 27 and 28, the concentricity of which must be held accurately with reference to the axis of rotation. If desired, the shoulder 27 could be eliminated and the alignment of the generator stator with the generator rotor accomplished by means of the shims as described above. Subsequently, the ring 29 could be doweled and bolted to the base as was done elsewhere in the unit during the assembly operation.

The invention has been described with particular reference to a preferred embodiment of the invention. Obviously, modifications will occur to others upon a reading and understanding of this specification which may differ considerably from that described as a preferred embodiment. It is my intention to include all such modifications insofar as they come within the scope of the appended claims or the equivalent thereof.

Having thus described my invention, I claim:

1. The method of manufacturing and assembling a motor generator unit comprising: producing a base member having a centrally located bearing support surface and a housing support surface square with the axis of said bearing support surface, a first and second housing each having a stator fixedly secured to the interior thereof, each of said stators being provided with a cylindrical bore, each of said housings being provided with end faces square with the axis of said bore, an end bell having a centrally located bearing support surface and a housing support surface square with the axis of said bearing support surface, and a rotor member consisting of a shaft on which is mounted two spaced rotors having diameters slightly smaller than the diameters of the corresponding stators, positioning one end of said first housing on said base positioning one end of the rotor with a bearing therefor within the first housing on said base, inserting circumferentially spaced shims of the same thickness between the rotor and the stator of the first housing, positioning the second housing about said rotor on the first housing, positioning circumferentially spaced shims of the same thickness between the rotor and the stator of the second housing, applying a bearing to the other end of the rotor shaft, positioning the end bell over said bearings on said second housing, fixedly securing the base to the first housing, the first housing to the second housing and the end bell to the second housing and then removing the shims.

2. The method of manufacturing and assembling a motor generator unit having a vertical axis of rotation comprising: producing a base member having a centrally located bearing support surface, a housing support surface square with the axis of said bearing support surface and a housing alignment surface concentric with the axis of said bearing support surface, a first and second housing each having a stator fixedly secured to the interior thereof, each of said stators being provided with a cylindrical bore, each of said housings being provided with end faces square with the axis of said bore, said first housing having an alignment surface concentric with said axis and of a diameter to cooperate with the alignment surface on said base member, an end bell having a centrally located bearing support surface and a housing support surface square with the axis of said bearing support surface, and a rotor member consisting of a shaft on which is mounted two spaced rotors having diameters slightly smaller than the diameters in the corresponding stators, positioning one end of the rotor with the bearing therefor on said base, positioning said first housing about said rotor with the alignment surfaces in matching relationship, inserting shims of the same thickness between the rotor and the stator of the first housing, positioning the second housing about said rotor on the first housing, positioning shims of the same thickness between the rotor and the stator of the second housing, applying a bearing to the other end of the rotor shaft, positioning the end bell over said bearing and said second housing, fixedly securing the base to the first housing, the first housing to the second housing and the end bell to the second housing and then removing the shims.

References Cited in the file of this patent

UNITED STATES PATENTS

| Number | Name | Date |
|---|---|---|
| 784,680 | Huyck | Mar. 14, 1905 |
| 827,331 | Tirrill | July 31, 1906 |
| 1,375,319 | Rae | Apr. 19, 1921 |
| 1,960,484 | Ekstromer | May 29, 1934 |
| 2,006,172 | Klappauf | June 25, 1935 |
| 2,179,561 | Oesterlein | Nov. 14, 1939 |
| 2,286,777 | Winther | June 16, 1942 |
| 2,677,065 | Van Der Heem | Apr. 27, 1954 |